United States Patent [19]

Oishi et al.

[11] 4,198,014
[45] Apr. 15, 1980

[54] MAGNETIC TAPE MAGAZINE

[75] Inventors: Kengo Oishi; Osamu Suzuki, both of Odawara, Japan

[73] Assignee: Fuji Photo Film Co., Ltd., Kanagawa, Japan

[21] Appl. No.: 946,458

[22] Filed: Sep. 27, 1978

Related U.S. Application Data

[63] Continuation of Ser. No. 796,655, May 13, 1977, abandoned.

[30] Foreign Application Priority Data

May 13, 1977 [JP] Japan .................................. 52-63281

[51] Int. Cl.² ............................................. G11B 23/10
[52] U.S. Cl. ................................... 242/199; 85/DIG. 2
[58] Field of Search ............... 242/197, 200, 198, 197, 242/210; 85/DIG. 2, 37; 264/340, 345; 360/132

[56] References Cited

U.S. PATENT DOCUMENTS

| | | | |
|---|---|---|---|
| 3,326,483 | 6/1967 | Ivans | 242/199 |
| 3,529,788 | 9/1970 | Sasaki et al. | 242/199 |
| 3,977,626 | 8/1976 | Gaiser et al. | 242/199 |

Primary Examiner—George F. Mautz

[57] ABSTRACT

Elastic cushion sheets are interposed between the side faces of the tape convolutions and respective halves of the casing of a magnetic tape magazine. The cushion sheets are held on the inner face of the halves by the engagement between a pair of holes provided through each of the cushion sheets and a pair of projections formed integrally on each of the halves. The outer diameter of the projections is slightly smaller than the inner diameter of the holes. The projections are initially formed to extend vertically from each half of the casing, and at least one of them on each half of the casing is made to incline with respect to the vertical after the cushion sheet is put thereon with the holes thereof engaged with the projections. The free end of each inclined projection is moved laterally beyond the edge of the associated hole. The cushion sheet is prevented from falling from the half of the casing even if the half is inverted with the inner face thereof directed downwardly as in assembling the tape magazine, whereby assembly is facilitated.

5 Claims, 6 Drawing Figures

MAGNETIC TAPE MAGAZINE

This is a continuation, of application Ser. No. 796,655, filed May 13, 1977, now abandoned.

BACKGROUND OF THE INVENTION

1. Field of the Invention

This invention relates to a magnetic tape magazine, and more particularly to a magnetic tape magazine in which a pair of elastic cushion sheets are interposed between the side faces of tape convolutions wound on a pair of cores, and the inner faces of the casing thereof.

2. Description of the Prior Art

In order to minimize the size of magnetic tape recorders, it is necessary to make the size of the magnetic tape magazine used therein as small as possible. In order to reduce the size of the magnetic tape magazine while providing the longest possible play time, it is necessary to manufacture thin long-play magnetic tapes. Long-play magnetic tapes should best be mirror finished to carry thereon a magnetic recording material with high density. The mirror finished thin magnetic tape is apt to jam and is hard to wind up on a core so that the side faces of the coiled tape are perfectly flat. For instance, the side faces of the tape convolution are apt to be curved or rough.

Particularly, when the tape is quickly advanced in the magazine or rewound at high speed, the side faces of the tape rub the inner face of the walls of the casing of the magazine, so that back tension on the tape increases when the tape is advanced in playing or recording.

Because of the increased back tension on the tape, the edges of the tape are permanently deformed and the recorded signal carried on the tape is degraded in quality, and accordingly the quality of reproduction is lowered.

In order to obviate the above mentioned defects, there has been proposed a magnetic tape magazine in which a pair of elastic cushion sheets are interposed between the side faces of the tape convolutions and the inner face of the casing thereof as disclosed in U.S. patent application Ser. No. 723,369, now U.S. Pat. No. 4,101,096. The cushion sheets press the side faces of the tape convolutions with a constant pressure whereby the tape is wound smoothly with small back tension into convolutions having flat side faces.

The cushion sheets can be made of an elastic material such as a formed plastic sheet material or synthetic paper. The material can be used mixed with lubricant or antistatic agent or used with lubricant or antistatic agent applied thereto. The thickness of the cushion sheets can be selected from between about 50 to 150$\mu$ according to the shape, structure and material thereof.

As is well known in the art, the magnetic tape magazine includes a casing comprising upper and lower halves which are coupled together in superimposed relation to form a space therebetween for receiving the tape convolutions therein. Heretofore, said cushion sheets have been supported on the inner face of the respective halves of the casing by means of holes provided therethrough and vertically extending rod-shaped projections integrally formed on the inner face of the corresponding half of the casing and inserted into said holes.

When the magnetic tape magazine is assembled, the cushion sheets are put on the respective halves of the casing with the holes and the projections engaged with each other before the halves are superimposed.

The magnetic tape magazine of this type has been found to be satisfactory in use. However the assembly of the tape magazine involves a difficulty in that, when superimposing the halves of the casing with one of them directed upwardly and the other directed downwardly, the cushion sheet supported on the upper half is apt to fall therefrom since the cushion sheet is held only by the force of friction between the side face of the vertically extending rod-shaped projections and the walls of the holes. Therefore, it has heretofore been very difficult to use an automatic system to assemble the magnetic tape magazine having cushion sheets.

There also has been proposed a magnetic tape magazine in which additional retaining members are provided on said rod-shaped projections to prevent the cushion sheets from falling from the upper half of the casing. The additional retaining members are secured to the free end of the rod-shaped projections by means of adhesive or welding after the cushion sheets are positioned on the respective halves of the casing.

However, this type of magnetic tape magazine is disadvantageous in that the number of parts and the amount of handling are increased, thereby increasing the manufacturing cost. Further, since the additional retaining members are provided on the tape side of the cushion sheet, the height of the member from the inner surface of the cushion sheet must be exactly controlled since, otherwise, the projecting end of the additional retaining member will come into contact with the magnetic tape. Thus the use of such additional retaining members introduces another difficulty in assembly.

SUMMARY OF THE INVENTION

In light of the foregoing observations and description, it is the primary object of the present invention to provide a magnetic tape magazine having cushion sheets in which the cushion sheets can be easily and effectively supported on the respective halves of the casing and can be prevented from falling therefrom even if the half is inverted.

It is another object of the present invention, to provide a magnetic tape magazine having cushion sheets which can be easily assembled by an automatic system.

The magnetic tape magazine in accordance with the present invention is characterized in that each cushion sheet is retained on the inner face of the associated half of the casing by means of a plurality of holes provided through the cushion sheet and a plurality of rod-shaped retaining members formed on the inner face of the half at least one of which retaining members is inclined with respect to the vertical. (Here and in the following description the inner faces of the cases are assumed to be horizontal.) The inclined retaining members are made to incline after the cushion sheet is positioned on the half of the casing with said holes mated with the retaining members.

The inclined retaining member can be inclined with respect to the vertical by imparting a pressure by any suitable pressing means. When the member is formed of a thermoplastic material, it is preferable that the member be heated when the pressure is imparted so that the member can be inclined easily and will not be damaged.

DESCRIPTION OF THE PREFERRED EMBODIMENTS

Figure 1:
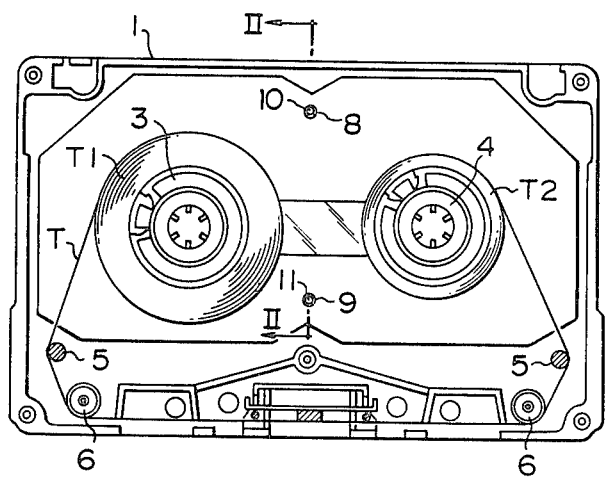
FIG. 1 is a plan view showing the internal structure of a magnetic tape magazine in accordance with an embodiment of the present invention.
Figure 2:
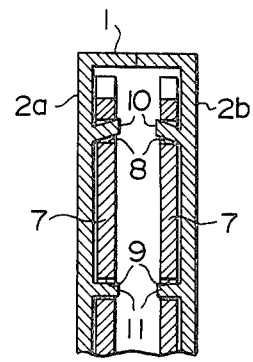
FIG. 2 is a fragmentary enlarged cross sectional view taken along line II—II of FIG. 1, FIGS. 3A and 3B are fragmentary enlarged cross sectional views showing a process employed in the embodiment of the present invention shown in FIG. 1 for causing the projections to incline.

Referring to FIGS. 1 and 2, a magnetic tape magazine in accordance with one embodiment of the present invention includes a rectangular casing 1 which consists of upper and lower halves 2a and 2b coupled in superimposed relation so that a space for accommodating tape convolutions therein is formed therebetween. A pair of cores 3 and 4 are rotatably mounted in the space. A magnetic tape T is wound on the cores 3 and 4 and is fed from one core to the other by way of guide means such as a pair of guide pins 5 and a pair of guide rollers 6. As clearly shown in FIG. 2, between the side faces of the tape convolutions T1 and T2 and the inner faces of the respective halves 2a and 2b are interposed a pair of cushion sheets 7. The cushion sheets 7 press the side faces of the tape convolutions T1 and T2 with a constant pressure so that the tape T is smoothly wound on one of the cores with small back tension into a convolution having flat side faces.

The cushion sheets 7 are held on the inner faces of the respective halves 2a and 2b of the casing 1 by the engagement of a pair of holes 8 and 9 provided through each of the sheets and a pair of rod-shaped projections 10 and 11 integrally formed on each half of the casing 1. The projections 10 are inclined with respect to the vertical, while the other projections 11 extend vertically from the halves of the casing 1. The distance between said holes 8 and 9 is substantially equal to the that between said projections 10 and 11, and the inner diameter of the holes 8 and 9 is slightly larger than the outer diameter of the projections 10 and 11.

Figure 3A:
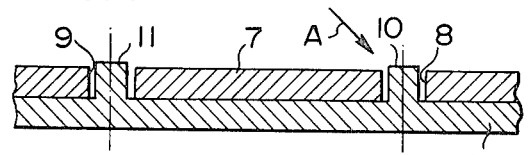

Said inclined projections 10 are initially formed to extend vertically from the inner face of the casing 1 as shown in FIG. 3A, and are made to incline with respect to the vertical after the cushion sheets 7 are put onto the inner faces of the halves. Thus said projections 10 and 11 can be easily engaged with respective holes 8 and 9 at first, and then the projections 10 can be imparted with a pressure to cause them to be inclined.

Figure 3B:
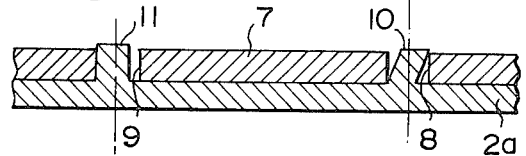

FIGS. 3A and 3B show the process for causing the projections 10 to incline. In FIGS. 3A and 3B, the holes 8 and 9 are somewhat enlarged for convenience of illustration.

As described above, the projections 10 are initially formed to extend vertically from the inner face of the half in the same manner as the other projections 11. Then, a cushion sheet 7 is put onto each half so that the holes 8 and 9 are engaged with the projections 10 and 11, respectively. Thereafter, the projection 10 is imparted with a pressure in, for example, the direction shown by the arrow A in FIG. 3A. This pressure causes the projection 10 to incline with respect to the vertical.

When the projection 10 is made to incline rightwardly, the right side thereof pushes the corresponding wall of the hole 8, whereby the cushion sheet 7 is moved rightwardly as shown in FIG. 3B. Accordingly, the left side of the other projection 11 is put into closer contact with the corresponding wall of the hole 9, whereby the force of friction therebetween is increased. And also, the top of the right side of the projection 10 is engaged with the top of the corresponding wall of the hole 8.

Thus, the increased friction force between the projection 11 and the hole 9, and the engagement between the top of the projection 10 and the top of the wall of hole 8 prevent the cushion sheet 7 from falling from the half of the casing 1 even when the half is inverted with its inner face directed downwardly.

The pressure applied to the projection 10 may be effected by any suitable device. When the projection 10 is made of a thermoplastic material integrally with the half, it is preferable that the projection 10 be heated at the time it is imparted with the pressure. The projection 10 may be inclined in any direction with respect to the vertical. The other projection 11 may also be inclined.

Figure 4A:
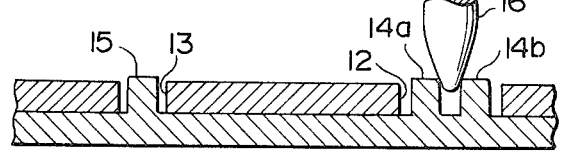
FIGS. 4A and 4B are views similar to FIGS. 3A and 3B showing a process employed in another embodiment of the present invention for causing the projections to incline.
Figure 4B:
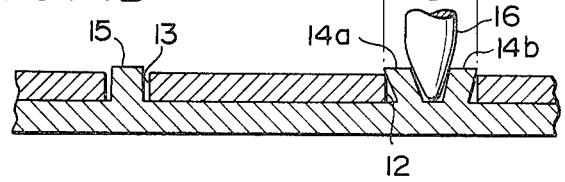

In another embodiment of the present invention shown in FIGS. 4A and 4B, each half is provided with three projections 14a, 14b and 15. The projections 14a and 14b are formed adjacent to each other. The cushion sheet is provided with a pair of holes 12 and 13. The hole 12 is enlarged so that it can receive the pair of projections 14a and 14b therein. The other hole 13 receives the other projection 15.

The pair of projections 14a and 14b are initially formed to extend vertically from the half of the casing in the same manner as the other projection 15. The cushion sheet and the corresponding half of the casing are superimposed as mentioned above in connection with the embodiment shown in FIGS. 1 to 3. Then, said pair of projections are caused to incline in opposite directions by inserting therebetween a tapered member 16 which has a thickness at the upper portion thereof larger than the space between the projections 14a and 14b. Accordingly, the distance D from the left edge of the projection 14a to the right edge of the projection 14b is made larger than the inner diameter of the enlarged hole 12, whereby the cushion sheet is prevented from falling from the half even if the half is inverted with its inner face directed downwardly.

We claim:

1. A magnetic tape magazine comprising a casing consisting of upper and lower halves coupled together in superimposed relation to form a space therebetween, a pair of cores rotatably mounted in the space, a magnetic tape wound in convolutions on the cores and a pair of cushion sheets interposed between the side faces of the tape convolutions and each of said halves of the casing, characterized in that the cushion sheet is held on each half of the casing by means of a plurality of holes formed through each cushion sheet and a plurality of rodshaped retaining members having a uniform cross-section over their length provided on the inner face of each half of the casing and inserted into said holes, said retaining members having an outer diameter smaller than the inner diameter of the holes, at least one of the retaining members being permanently inclined with respect to its vertical axis, the inclined retaining members being made to incline after the cushion sheet is superimposed with the corresponding half of the casing with the holes thereof being mated with the retaining members of the half, whereby the side face of the inclined retaining member is put into engagement with the corresponding wall of the hole of the cushion sheet so that the cushion sheet is prevented from falling from the half of the casing.

2. A magnetic tape magazine as defined in claim 1 in which said retaining members are made integrally with the corresponding half of the casing and are made to incline by imparting a pressure thereto.

3. A magnetic tape magazine as defined in claim 2 in which the casing and the retaining members are made of thermoplastic material and the retaining members are heated when the pressure is imparted.

4. A magnetic tape magazine as defined in claim 1 in which at least one of the holes is somewhat enlarged and a pair of retaining members provided adjacent to each other are inserted into the enlarged hole and made to incline in opposite directions.

5. A magnetic tape magazine as defined in claim 1 in which said retaining members are of cylindrical configuration.

* * * * *

UNITED STATES PATENT AND TRADEMARK OFFICE
CERTIFICATE OF CORRECTION

PATENT NO. : 4,198,014
DATED : April 15, 1980
INVENTOR(S) : Kengo Oishi et al.

It is certified that error appears in the above—identified patent and that said Letters Patent is hereby corrected as shown below:

On the Title Page, Item (30) should read as follows:

-- May 18, 1976    Japan........51-63281 --.

Signed and Sealed this

Ninth Day of December 1980

[SEAL]

Attest:

SIDNEY A. DIAMOND

Attesting Officer

Commissioner of Patents and Trademarks